(12) United States Patent
Murach et al.

(10) Patent No.: US 6,171,718 B1
(45) Date of Patent: Jan. 9, 2001

(54) PRESSURIZED WATER RECOVERY SYSTEM FOR A FUEL CELL POWER PLANT

(75) Inventors: Bryan L. Murach, New Britian; Leslie L. Van Dine, Manchester, both of CT (US)

(73) Assignee: International Fuel Cells, LLC, South Windsor, CT (US)

( * ) Notice: Under 35 U.S.C. 154(b), the term of this patent shall be extended for 0 days.

(21) Appl. No.: 09/221,338

(22) Filed: Dec. 28, 1998

(51) Int. Cl.$^7$ .................................................. H01M 8/04
(52) U.S. Cl. ................................. 429/13; 425/25; 425/26
(58) Field of Search .................. 429/13, 25, 26

(56) References Cited

U.S. PATENT DOCUMENTS

| | | | |
|---|---|---|---|
| 4,738,903 | * 4/1988 | Garow et al. | 429/25 X |
| 4,769,297 | 9/1988 | Reiser et al. | 429/17 |
| 4,923,768 | * 5/1990 | Kaneko et al. | 429/25 X |
| 5,200,278 | * 4/1993 | Watkins et al. | 429/26 X |
| 5,441,821 | * 8/1995 | Merritt et al. | 429/25 X |
| 5,503,944 | 4/1996 | Meyer et al. | 429/13 |
| 5,573,866 | 11/1996 | Van Dine et al. | 429/13 |
| 5,700,595 | 12/1997 | Reiser | 429/13 |
| 5,968,680 | * 10/1999 | Wolfe et al. | 429/13 |
| 6,013,385 | * 1/2000 | Dubose | 429/26 X |

FOREIGN PATENT DOCUMENTS 60-124361 * 7/1985 (JP) .......................... 429/25
63-279576 * 11/1988 (JP) .

* cited by examiner

Primary Examiner—Stephen Kalafut
(74) Attorney, Agent, or Firm—Malcolm J. Crisholm, Jr.

(57) ABSTRACT

The invention is a pressurized water recovery system for a fuel cell power plant including at least one fuel cell having an electrolyte between anode and cathode electrodes for producing an electric current from a reducing fluid and an oxidant stream. A coolant loop directs a coolant fluid from a reservoir through a coolant passage to the fuel cell and back to the reservoir, and the coolant loop also receives coolant fluid through water lines secured between condensing heat exchangers and the coolant reservoir. A process exhaust passage directs a process exhaust stream from adjacent the cathode and anode electrodes out of the fuel cell and into a condensing heat exchanger. Whenever the power plant is under coolant stress, a process exhaust valve selectively directs a portion of the process exhaust stream out of the process exhaust passage to a supercharger that pressurizes the received portion of the process exhaust stream and directs the pressurized portion to a pressurized condensing heat exchanger. Because the process exhaust stream within the pressurized heat exchanger is under pressure, an increased amount of water condenses out of the stream without a need to continuously pressurize any of the fuel cell components. The increased amount of condensed water is directed to the coolant reservoir, and whenever the coolant stress ends, the process exhaust valve and supercharger stop pressurizing any portion of the process exhaust stream.

19 Claims, 3 Drawing Sheets

PRESSURIZED WATER RECOVERY SYSTEM FOR A FUEL CELL POWER PLANT

TECHNICAL FIELD

The present invention relates to fuel cell power plants that operate at about ambient pressures and are suited for usage in transportation vehicles, as portable power plants, or as stationary power plants, and the invention especially relates to a fuel cell power plant that utilizes a pressurized condensing heat exchanger to enhance water recovery and self-sufficiency and energy efficiency during hot weather operation of the plant.

BACKGROUND OF THE INVENTION

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame that defines manifolds for directing flow of reducing, oxidizing, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane as the electrolyte, the hydrogen electrochemically reacts at a surface of an anode catalyst to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is a proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention. Furthermore, high electrochemical activity of PEM cells results in high power density which minimizes weight and volume of the cell. As is well-known however, PEM cells have significant limitations especially related to liquid water transport to, through and away from the PEM, and related to simultaneous transport of gaseous reducing and oxidant fluids to and from the electrodes adjacent opposed surfaces of the PEM. The prior art includes many efforts to minimize the effect of those limitations.

In operation of a fuel cell employing a PEM, the membrane is saturated with water, and the anode electrode adjacent the membrane must remain wet. As hydrogen ions produced at the anode electrode transfer through the electrolyte, they drag water molecules with them from the anode to the cathode. Water also transfers back to the anode from the cathode by osmosis. Product water formed at the cathode electrode is removed by evaporation or entrainment into a circulating gaseous stream of oxidant, or by capillary action into and through a porous coolant transport plate adjacent the cathode. The porous coolant transport plates are part of a coolant loop that directs liquid water from a supply or reservoir of coolant through a coolant passage to the transport plates adjacent the cathode electrode, and back to the coolant water supply. The coolant plates thereby also serve to remove heat from the electrolyte and electrodes, as is well-known in the art, and described in more detail in U.S. Pat. Nos. 4,769,297 and 5,503,944 assigned to the assignee of the present invention.

In operation of PEM fuel cells, it is critical that a proper water balance be maintained between a rate at which water is produced at the cathode electrode and rates at which water is removed from the cathode and at which liquid water is supplied to the anode electrode. An operational limit on performance of a fuel cell is defined by an ability of the cell to maintain the water balance as electrical current drawn from the cell into the external load circuit varies and as an operating environment of the cell varies. For PEM fuel cells, if insufficient water is returned to the anode electrode, adjacent portions of the PEM electrolyte dry out thereby decreasing the rate at which hydrogen ions may be transferred through the PEM and also resulting in cross-over of the reducing fluid leading to local over heating. Similarly, if insufficient water is removed from the cathode, the cathode electrode may become flooded effectively limiting oxidant supply to the cathode and hence decreasing current flow. Additionally, if too much water is removed from the cathode by the gaseous stream of oxidant, the cathode may dry out limiting ability of hydrogen ions to pass through the PEM, thus decreasing cell performance.

As fuel cells have been integrated into power plants developed to power transportation vehicles such as automobiles, trucks, buses, etc., maintaining an efficient water balance within the power plant has become a greater challenge because of a variety of factors. For example, with a stationary fuel cell power plant, water lost from the plant may be replaced by water supplied to the plant from off-plant sources. With a transportation vehicle, however, to minimize weight and space requirements of a fuel cell power plant the plant must be self-sufficient in water to be viable. Self-sufficiency in water means that enough water must be retained within the plant to offset losses from reactant fluids exiting the plant in order to efficiently operate the plant. Any water exiting the plant through a plant exhaust stream consisting of a cathode exhaust stream of gaseous oxidant and/or an anode exhaust stream of gaseous reducing fluid must be balanced by water produced electrochemically at the cathode electrode and water retained within the plant.

For example, an ambient pressure, gasoline powered PEM fuel cell must be self-sufficient in water to be a viable power source for vehicles. Such a power source requires fuel processing components to process the gasoline into a hydrogen rich reactant fluid. The fuel processing components use water in the form of steam in a boiler as a reactant in processing the gasoline, and the water for the fuel processing components must be supplied from water produced at the cathode in the fuel cell as a result of the above described electrochemical reaction. As is well-known however, the water produced at the cathode electrode is swept from the cell within the cathode exhaust stream and within a combustor exhaust stream passing out of an anode exhaust combustor that burns the anode exhaust to provide heat to a boiler. For convenience, the cathode exhaust and/or combined cathode exhaust and combusted anode exhaust exiting the plant will be referred to as a process exhaust stream. It is known to recover some of the water in the process exhaust stream by passing the process exhaust stream through a condensing heat exchanger to cool the stream and thereby condense the water out of the stream. The condensed water is then accumulated and directed to the fuel cell coolant loop and the fuel processing components as required to maintain the plant in water balance.

An example of a PEM fuel cell power plant using a condensing heat exchanger is shown in U.S. Pat. No. 5,573,866 that issued on Nov. 12, 1996 to Van Dine et al., and is assigned to the assignee of the present invention, and which patent is hereby incorporated herein by reference. Many other fuel cell power plants that use one or more condensing heat exchangers are well-known in the art, and they typically use ambient air streams as a cooling fluid passing through the exchanger to cool the plant exhaust streams. In Van Dine et al., the heat exchanger is used to cool an exhaust stream exiting a cathode chamber housing the cathode electrode. Prior to entering the cathode housing, the same stream provides air as the oxidant for the cathode electrode, and upon leaving the chamber the stream includes evaporated product water and some portion of methanol, the reducing fluid, that has passed through the PEM. The condensing heat exchanger passes the process exhaust stream in heat exchange relationship with a stream of cooling ambient air, and then directs condensed methanol and water indirectly through a piping system back to an anode side of the cell.

While condensing heat exchangers have enhanced water balance and energy efficiency of ambient fuel cell power plants, the heat exchangers encounter decreasing water recovery efficiency as ambient temperatures increase. Where the power plant is to power a transportation vehicle such as an automobile, the plant will be exposed to an extremely wide range of ambient temperatures. For example where an ambient air cooling fluid passes through a heat exchanger, performance of the exchanger will vary as a direct function of the temperature of the ambient air because decreasing amounts of liquid precipitate out of power plant exhaust streams as the ambient air temperature increases. Additionally, if the ambient temperatures approximate operating temperatures of the fuel cell, heat rejection capacities per unit area of any power plant heat exchangers will decrease dramatically, mandating larger heat exchangers.

An additional complication of known fuel cell power plants designed for use in transportation vehicles is also related to fluctuations in ambient air conditions. Fuel cells of such plants typically utilize ambient air as the oxidant directed to the cathode electrode and as a cooling fluid for the condensing heat exchanger, as referred to above. Such hot, dry ambient air raises a temperature and dewpoint of the plant or process exhaust well above process exhaust stream dewpoints necessary to achieve fuel cell water balance. For example, a fuel cell may require its process exhaust stream dewpoint to be at or below 105 degrees fahrenheit (°F.). But, where the ambient temperature is greater than 105° F., water balance cannot be achieved using an ambient cooling fluid cooled condensing heat exchanger at ambient pressure.

Consequently, many efforts have been undertaken to prevent excess water loss resulting in drying out of the cathode or anode electrode and adjacent electrolyte especially in PEM fuel cells, including: directing liquid condensate from condensing heat exchangers to humidify gaseous reactant and oxidant streams entering the cell; adding porous support layers and water transport plates in fluid communication with the electrodes for movement of coolant water through adjacent cells; generating a pressure differential on the anode side of the cell wherein gaseous reducing fluids are maintained at a slightly higher pressure than coolant water and anode supply water passing through the porous support layers adjacent reducing gas distribution channels so that the pressure differential assists water transport through the porous support layers and cell; and, increasing air utilization by the cathode through decreasing volumetric flow of the oxidant stream by the cathode. Such efforts at maintaining efficient water balance involve additional cost, weight, volume burdens, fuel cell performance penalties, and often require complicated control apparatus.

An alternative approach to enhancing water balance for fuel cell power plants in transportation vehicles is to continuously pressurize the cell and related components to increase reactant concentrations in high pressure gaseous streams and reduce volumetric flow through the cell and thereby reduce water loss through plant exhaust streams. Such continuously pressurized fuel cell power plants, however, require additional cost, weight and control apparatus in providing appropriate pressure housings and controls, and pressurized plants require additional energy derived from the plant to operate pressurizing pumps, valves, fans, etc., and are not known to be practical for portable power plants.

Accordingly, known plants that employ ambient air as the cathode oxidant, that use ambient air for condensing heat exchangers, or that continuously pressurize the fuel cell and related components are incapable of maximizing an efficient water balance and minimizing operating energy requirements because of their above described characteristics. It is therefore highly desirable to produce a fuel cell power plant that minimizes operating energy requirements to maintain the plant in water balance during periodic hot weather utilization of the plant.

DISCLOSURE OF THE INVENTION

The invention is a pressurized water recovery system for a fuel cell power plant. The system includes: a fuel cell power plant with at least one fuel cell having an electrolyte between anode and cathode electrodes for producing an electric current from a reducing fluid and an oxidant stream; a coolant loop that directs a coolant fluid from a coolant reservoir through a coolant passage to the fuel cell and back to the reservoir, and that receives coolant fluid through a condensed water line secured between a condensing heat exchanger and the coolant loop; a process exhaust valve in fluid communication with a process exhaust passage, which passage combines into a process exhaust stream cathode and anode exhaust streams received from the fuel cell and directs the process exhaust stream into the condensing heat exchanger, wherein the process exhaust valve selectively directs any portion of the process exhaust stream out of the process exhaust passage; a supercharger in fluid communication with the process exhaust valve that receives the portion of the process exhaust stream directed out of the process exhaust passage by the valve, wherein the supercharger pressurizes the received portion of the process exhaust stream and directs the pressurized portion to a pressurized condensing heat exchanger; and, a pressure valve secured to an outlet of the pressurized condensing heat exchanger that selectively restricts discharge of the process exhaust stream out of the pressurized heat exchanger to pressurize the process exhaust stream within the pressurized heat exchanger.

During normal operation of a fuel cell power plant having the pressurized water recovery system for example to power a vehicle, while ambient temperatures are within a normal range the process exhaust valve directs none of the process exhaust stream to the supercharger, and the process exhaust stream passes through the condensing heat exchanger and out of the exchanger within a process exhaust vent at slightly above ambient pressure. The condensing heat exchanger is dimensioned to deliver adequate coolant fluid to the coolant loop under such conditions to maintain the plant in water balance.

However, when ambient air temperatures rise beyond the normal range, the heat rejection capacity of the condensing heat exchanger is lowered because the heat exchanger uses ambient air as a cooling fluid, resulting in less water condensed out of the process exhaust stream and sent to the coolant loop. To prevent the fuel cell power plant from moving out of water balance under such high ambient air temperature conditions, the process exhaust valve directs a portion of the process exhaust stream into the supercharger to pressurize the stream, and the pressure valve restricts discharge out of the pressurized condensing heat exchanger so that the exhaust stream within the pressurized heat exchanger is increased in pressure from sightly above ambient to about 20 pounds per square inch atmospheric (hereafter "p.s.i.a."). Because the pressure of the process exhaust stream within the pressurized heat exchanger is increased, the amount of water that is condensed at any given process exhaust stream temperature in the pressurized condensing heat exchanger is increased. Therefore, the pressure can be adjusted high enough to recover an appropriate amount of water to maintain the fuel cell power plant in water balance at a particular process exhaust stream temperature achievable by the high temperature ambient air cooling fluid.

Whenever ambient air temperatures drop back into the normal range, the process exhaust valve stops directing any portion of the process exhaust stream to the supercharger, and the supercharger is shut down. Consequently, the pressurized water recovery system requires only a short-term parasitic power drain from the fuel cell power plant, and does not require that the entire power plant or any of its sub-systems be continuously pressurized. The supercharger may be powered by a variety of sources, such as by electrical energy supplied directly from the fuel cell, by mechanical coupling to ancillary plant systems, by stored electricity, etc.

Accordingly, it is a general object of the present invention to provide a pressurized water recovery system for a fuel cell power plant that overcomes deficiencies of the prior art.

It is a more specific object to provide a pressurized water recovery system for a fuel cell power plant that requires only temporary parasitic power demands to enhance water recovery during short-duration hot weather operations and thereby permits the plant to operate more efficiently under normal, non-hot weather operations.

It is a further specific object to provide a pressurized water recovery system for a fuel cell power plant that selectively increases heat rejection capacity of a condensing heat exchanger of the plant during hot weather operations.

It is yet an additional object to provide a pressurized water recovery system for a fuel cell power plant that increases water recovery capacity of a fuel cell power plant without altering structural characteristics or operation of fuel cell and/or coolant loop components of the plant.

These and other objects and advantages of this invention will become more readily apparent when the following description is read in conjunction with the accompanying drawings.

DESCRIPTION OF THE PREFERRED EMBODIMENTS

Figure 1:
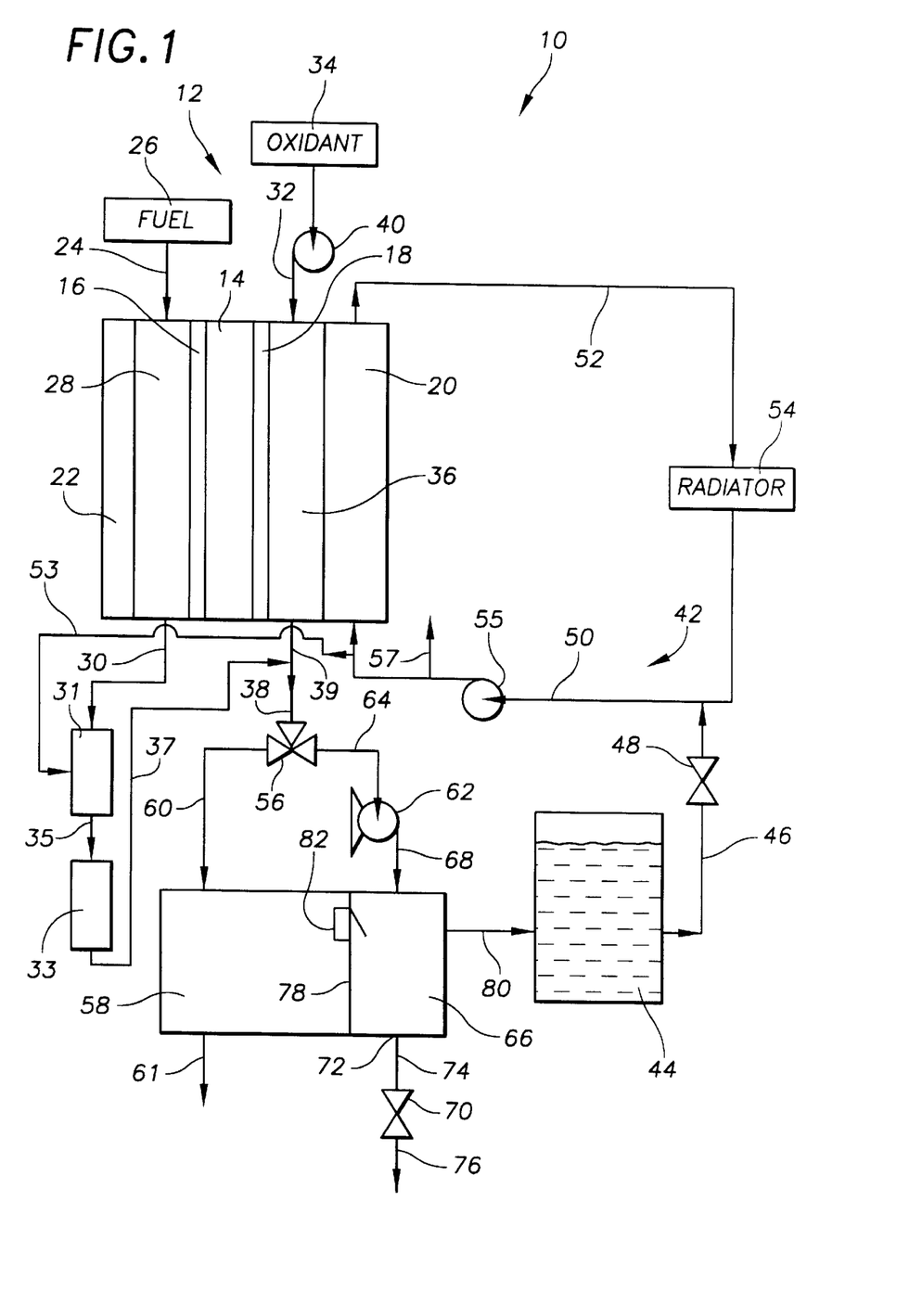
FIG. 1 is a schematic view of a pressurized water recovery system for a fuel cell power plant constructed in accordance with the present invention.

Referring to the drawings in detail, a pressurized water recovery system for a fuel cell power plant constructed in accordance with the present invention is shown schematically in FIG. 1, and generally designated by the reference numeral 10. The system 10 includes at least one fuel cell means for producing an electric current from a reducing fluid and an oxidant stream, such as fuel cell 12. The fuel cell 12 includes an electrolyte 14 such as a proton exchange membrane ("PEM") or an acid or base electrolyte; an anode electrode 16, and a cathode electrode 18 on opposed sides of the electrolyte 14; and, a porous coolant transport plate 20 adjacent the cathode electrode 18. The fuel cell 12 may be combined with other virtually identical fuel cells (not shown) in a well-known manner to form a cell stack assembly enclosed within a frame structure 22 shown schematically in FIG. 1 that defines manifolds for directing a reducing fluid stream and oxidant stream into and out of the fuel cell 12 in a manner well-known in the art. A reducing fluid inlet 24 directs a hydrogen-rich reducing fluid from a fuel supply 26 (shown in FIG. 1 schematically with a label "FUEL" to facilitate understanding) into the cell 12 through fuel manifolding defined within the frame 22 so that the reducing fluid passes through an anode flow field 28 defined adjacent the anode electrode 16, and a reducing fluid outlet 30 directs the reducing fluid out of the fuel cell 12 as an anode exhaust stream. The anode exhaust stream then flows through the reducing fluid outlet 30 into an anode exhaust combustor 31 that burns fuel remaining in the anode exhaust stream to supply heat for fuel processing component means (not shown) known in the art for processing hydrocarbon fuels into the reducing fluid fuel. The anode exhaust combustor may be a conventional burner or a catalytic burner and would normally be integrated into the fuel processing component means. The combusted anode exhaust stream then passes into an anode heat exchanger 33 through anode line 35 and then into an anode exhaust passage 37 that directs the combusted anode exhaust in to a process exhaust passage 38. Similarly, an oxidant inlet 32 directs an oxidant stream such as air from an oxidant supply 34 (shown in FIG. 1 with a label "OXIDANT") into the cell 12 through oxidant manifolding defined within the frame 22 so that the oxidant stream passes through a cathode flow field 36 defined adjacent the cathode electrode 18, and a cathode exhaust passage 39 directs the oxidant stream out of the fuel cell 12 as a cathode exhaust stream into the process exhaust passage 38 where the cathode exhaust stream mixes with the anode exhaust stream to become a process exhaust stream. The system 10 may also include a blower 40 positioned on the oxidant inlet 32 to variably accelerate flow of the oxidant into the cathode flow field 36. It is stressed that such a blower is of a capacity to only slightly increase operating pressures of the oxidant stream within the oxidant inlet 32 to a range of from atmospheric pressure to about 1.0 P.S.I.

above atmospheric pressure, or from about 14.7 P.S.I.A. to about 15.7 P.S.I.A.

The system 10 also includes a coolant loop 42 that directs a coolant fluid such as water from a coolant reservoir 44 through a coolant feed line 46, coolant supply valve 48 and into a feed coolant passage 50 that directs the coolant fluid into the coolant transport plate 20 within the fuel cell 12 adjacent the cathode flow field 36, out of the fuel cell 12 and into a return coolant passage 52 back to the feed coolant passage 50 or coolant reservoir 44, depending upon a setting of the coolant supply valve 48. If the fuel cell is generating more water at the cathode electrode than is needed by the coolant loop 42 to cool the fuel cell and provide water for other sub-systems of the fuel cell power plant (e.g., such as hydrocarbon fuel processing components well-known in the art (not shown)), the coolant supply valve 48 would then direct excess coolant fluid from the coolant passages 50, 52 into the coolant reservoir 44 or out of the coolant loop 42. In contrast, if the fuel cell 12 is losing more coolant water than is being generated at the cathode electrode 18, such as through the cathode exhaust stream or through other coolant usages, then the coolant supply valve would direct coolant fluid accumulated in the coolant reservoir 44 into the feed coolant passage 50. The coolant loop may also include a coolant heat exchanger 54, such as a common automotive radiator, positioned on the return coolant passage 52, to place the coolant fluid within the passage 52 as a working fluid in heat exchange relationship with a cooling fluid such as ambient air passing through the coolant heat exchanger 54. A coolant pump 55 may also be part of the coolant loop 42 situated on for example one of the coolant passages 50, 52, such as on the feed coolant passage 50 as shown in FIG. 1. The coolant loop 42 also supplies coolant such as water through a first feed line 53 to the anode exhaust combustor 31 to be converted into steam, and through a second feed line 57 to other fuel processing component means (not shown). The coolant loop 42 and system 10 may also include additional components well-known in the fuel cell art, such as disclosed in U.S. Pat. No. 5,700,595 to Reiser, issued on Dec. 23, 1997 to the assignee of the present invention, which Patent is hereby incorporated herein by reference.

The pressurized water recovery system 10 also includes a process exhaust valve 56 secured in fluid communication with the process exhaust stream passing through the process exhaust passage 38. The process exhaust valve 56 is a three-way valve well-known in the art that may selectively permit unrestricted passage of the process exhaust stream through the valve 56 into a condensing heat exchanger 58 directly (not shown), or through a first process exhaust passage extension 60 (as shown in FIG. 1), so that the process exhaust stream may then pass out of the condensing heat exchanger 58 through a process exhaust stream vent 61. Alternatively, the process exhaust valve 56 may divert any portion of the process exhaust stream out of the process exhaust passage 38 and into a supercharger 62 in fluid communication directly with the valve 56, or through a first diversion line 64.

The supercharger 62 pressurizes the portion of the process exhaust stream received from the process exhaust valve 56, and directs that portion into a pressurized condensing heat exchanger 66 through a second diversion line 68. A pressure valve 70 is in fluid communication with an outlet 72 of the pressurized condensing heat exchanger 66 through first pressure line 74, and with a pressurized process exhaust stream vent 76 that directs the pressurized process exhaust stream out of the system 10. The pressure valve 70 may be a valve well-known in the art that can be selectively adjusted to restrict fluid discharge through the valve until the fluid attains a desired pressure, so that the supercharger 62 and pressure valve 70 cooperatively interact to produce a desired pressure of the process exhaust stream passing through the pressurized heat exchanger 66. The supercharger 62 may likewise be any of a variety of gaseous compressors well-known in the art that can be selectively set to generate desired compression of gaseous fluids passing through the compressors. The pressurized condensing heat exchanger 66 may be of a standard design of condensing heat exchangers well-known in the art wherein the working fluid that is to lose heat and condensed liquid is primarily a gas with some entrained liquid, and the cooling fluid that removes the heat is a gas such as ambient air, and the working fluid is pressurized. Operational estimates for the pressurized water recovery system 10 indicate that optimal efficiencies will be achieved by pressurizing the process exhaust stream within the pressurized condensing heat exchanger up to approximately 20 P.S.I.A. However, the final pressure required is a function of ambient air temperature and required dewpoint of the process exhaust stream necessary to achieve water balance of the fuel cell power plant.

Controls of the pressure valve 70 and supercharger 62 may also be any of the controls well-known in the art including for example mechanical, electro-mechanical, or microcomputer generated signal control apparatus, so that whenever sensors of such apparatus detect that the ambient temperatures exceed a specific reading, and/or whenever the fuel cell 12 and coolant loop 14 start to move out of water balance, as indicated for example by sensors monitoring coolant levels within the coolant reservoir 44, the process exhaust valve 56 is controlled to divert a portion of the process exhaust stream into the supercharger 62, and the supercharger 63 is controlled to pressurize that portion of the process exhaust stream, which then passes through the pressurized condensing heat exchanger 66 to increase water recovery from the pressurized process exhaust stream. The pressure valve 70 maybe pre-set to a specific pressure setting, or may be selectively controlled to settings appropriate for dynamic system 10 needs, as is well-known in the pressure valve art. Whenever the sensors indicate that the fuel cell 12 and coolant loop 42 are back in water balance, the process exhaust valve 62 is controlled to direct all of the process exhaust stream into the condensing heat exchanger 58, and the supercharger is shut down. The supercharger 62 may be powered by any of a variety of energy sources well-known in the fuel cell art for powering ancillary systems, such as by electricity generated by the fuel cell 12, by electricity stored in a battery component (not shown) of the fuel cell power plant, or by mechanical coupling to ancillary systems (not shown) of the fuel cell power plant.

It is pointed out that the process exhaust valve 56 is described herein as being structured to divert any portion of the process exhaust stream within the process exhaust passage 38 into the supercharger 62. By the phrase "any portion", it is meant to describe the process exhaust valve 56 as being able to divert from a portion as small as 1% of the process exhaust stream up to 100% of the stream. In the event of a modest, short-term demand, energy efficiency would require diversion of only a small portion of the process exhaust stream. However, in the event of extreme coolant stress and/or fuel cell water loss occasioned by very high temperature, dry ambient air, by accidental decrease in heat rejection capacities of the heat exchangers 54, 58, 66 due to temporary blockages, or by accidental, low-level leakage of coolant out of the coolant loop, the process exhaust valve 56 may divert virtually all of the process exhaust stream into the supercharger 62 and pressurized condensing heat exchanger 66 to maximize water recovery from the fuel cell 12.

FIG. 1 shows the pressurized water recovery system 10 for a fuel cell power plant of the present invention in an embodiment wherein the condensing heat exchanger 58 and the pressurized condensing heat exchanger 66 are integral, and divided by a separator wall 78. Such an arrangement affords efficiencies wherein the two heat exchangers 58, 66 may cooperatively feed water condensed out of both heat exchangers 58, 66 into a common condensed water line 80 secured between the heat exchangers 58, 66 and the coolant reservoir 44, so that condensed water from the two condensing heat exchangers is directed back into the fuel cell 12 through the coolant loop 42. An additional efficiency of the pressurized condensing heat exchanger 66 and non-pressurized condensing heat exchanger 58 being integrated and sharing the separator 78 wall is that through use of at least one pressure actuated check valve 82 in the separator wall, the un-pressurized process exhaust stream passing through the condensing heat exchanger may enter the pressurized heat exchanger 66 when the supercharger 62 is not operating, thereby increasing area exposure of the condensing heat exchangers 58, 66 to the process exhaust stream during normal operation of the system 10. Whenever the process exhaust valve 56 and supercharger 62 are activated to pressurize a portion of the process exhaust stream, the pressurized exhaust stream within the pressurized condensing heat exchanger 66 serves to close the pressure actuated check valve 82 so that the pressurized process exhaust stream does not enter the un-pressurized condensing heat exchanger.

While the process exhaust passage 38 is shown in FIG. 1 receiving both the burned anode exhaust stream from the anode exhaust passage 37 and the cathode exhaust stream from the cathode exhaust passage 37, it is to be understood that the process exhaust stream within the process exhaust passage 38 may at times include only the cathode exhaust stream, and in alternative embodiments of the invention, the anode exhaust stream may be directed to not enter the process exhaust passage 38, so that the system 10 only pressurizes the cathode exhaust stream as the process exhaust stream.

Figure 2:
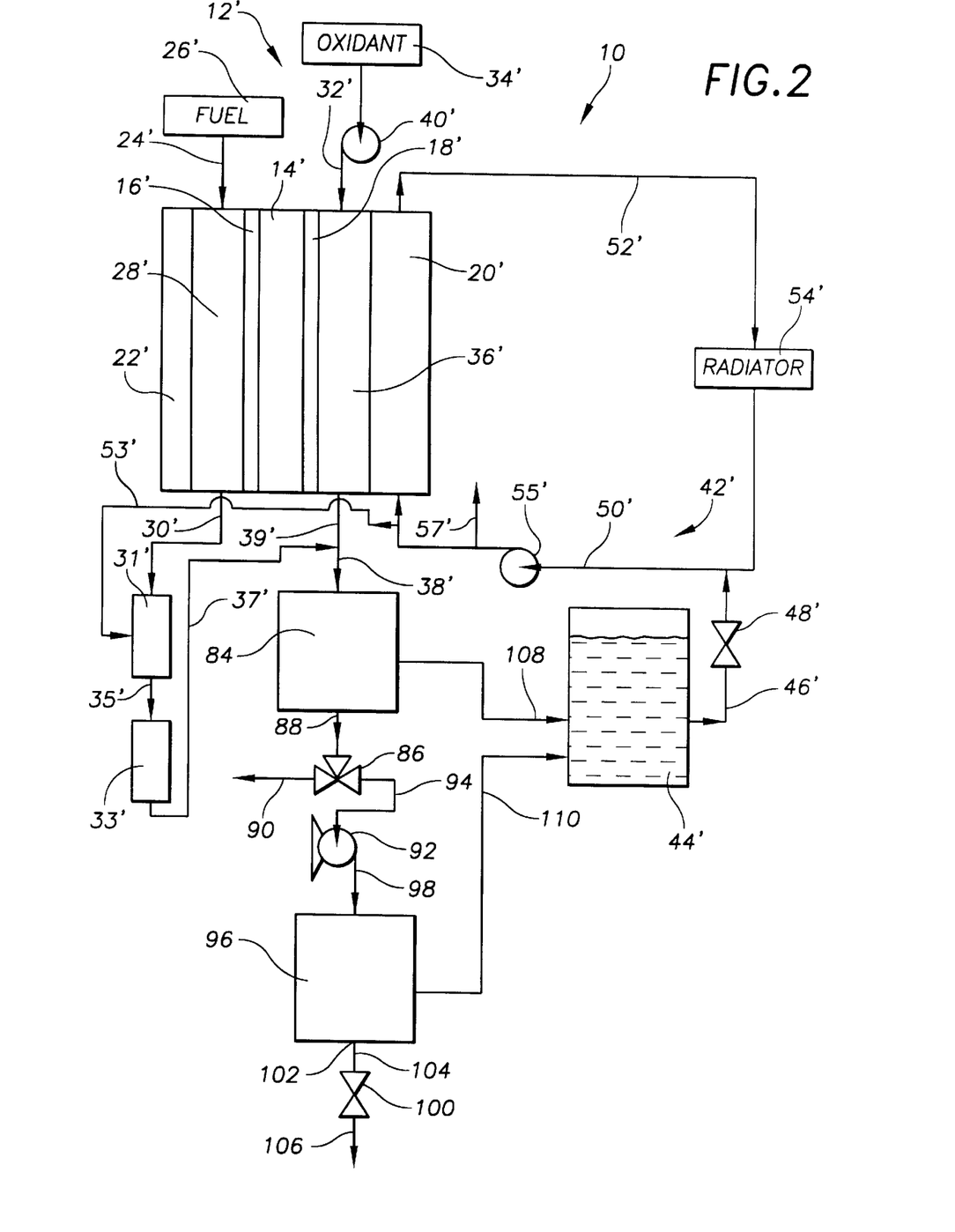
FIG. 2 is a schematic view of a first alternative embodiment of a pressurized water recovery system for a fuel cell power plant of the present invention.

FIG. 2, shows a first alternative embodiment of the pressurized water recovery system 10 for a fuel cell power plant of the present invention. For convenience, components of the system 10 that are shown in FIG. 1 that are identical to the components shown in FIG. 2 are given primes in FIG. 2 of the same reference numerals appearing in FIG. 1. In FIG. 2, the process exhaust passage 38' first directs the process exhaust stream through an independent condensing heat exchanger 84, and then into a second process exhaust valve 86, either directly, or through a second process exhaust passage extension 88 shown in FIG. 2. The second process exhaust valve 86, like the process exhaust valve 56 of FIG. 1, is a three-way valve well-known in the art that may selectively permit unrestricted passage of the process exhaust stream received from the independent condensing heat exchanger 84 out of the system 10 through a second process exhaust stream vent 90 secured to the second process exhaust valve 86. Alternatively, the second process exhaust valve 86 may divert any portion of the process exhaust stream out of the process exhaust passage extension 88 and into a second supercharger 92 in fluid communication with the valve 86 directly, or through a third diversion line 94.

As with the FIG. 1 embodiment, the second supercharger 92 pressurizes the portion of the process exhaust stream received from the second process exhaust valve 86, and directs that pressurized portion into a second pressurized condensing heat exchanger 96 either directly, or through a fourth diversion line 98. A second pressure valve 100 is in fluid communication with an outlet 102 of the second pressurized condensing heat exchanger 96 either directly, or through a second pressure line 104, and the valve 100 is in fluid communication with a second pressurized process exhaust stream vent 106 that directs the process exhaust stream out of the system 10. The second supercharger 92, second pressurized condensing heat exchanger 96, and second pressure valve 100 are similar to the supercharger 62, pressurized condensing heat exchanger 66, and pressure valve 70 described above with reference to the FIG. 1 embodiment of the pressurized water recovery system 10, and the controls of the second supercharger 92 and second pressure valve 100 necessary to operate the system 10 to achieve enhanced water recovery are similar to those described above.

The FIG. 2 first alternative embodiment of the pressurized water recovery system differs from the FIG. 1 embodiment essentially in that the second pressurized condensing heat exchanger 96 is not-integral with the independent condensing heat exchanger 84, and the independent heat exchanger 84 receives all of the process exhaust stream, whereas the condensing heat exchanger 58 of the FIG. 1 embodiment may receive only a portion of the process exhaust stream when the pressurized heat exchanger 66 is being utilized. The FIG. 2 embodiment thereby affords specific efficiencies for the system 10 wherein the fuel cell 12 power plant is to be used in a specific working environment wherein hot weather stresses are more predictable. For example, in such circumstances the second pressurized condensing heat exchanger 96 may be dimensioned to a minimum size to meet only such foreseeable hot-weather conditions, while the independent condensing heat exchanger 84 may likewise be dimensioned to a minimum size for efficiency in meeting ordinary, non hot-weather operating conditions. Where the second pressurized condensing heat exchanger is not integral with the independent condensing heat exchanger as in the FIG. 2 embodiment, a first condensed water line 108 directs condensed water from the independent condensing heat exchanger 84 to the coolant reservoir 44, and a second condensed water line 110 directs condensed water from the second pressurized condensing heat exchanger 96 to the coolant reservoir 44.

Figure 3:
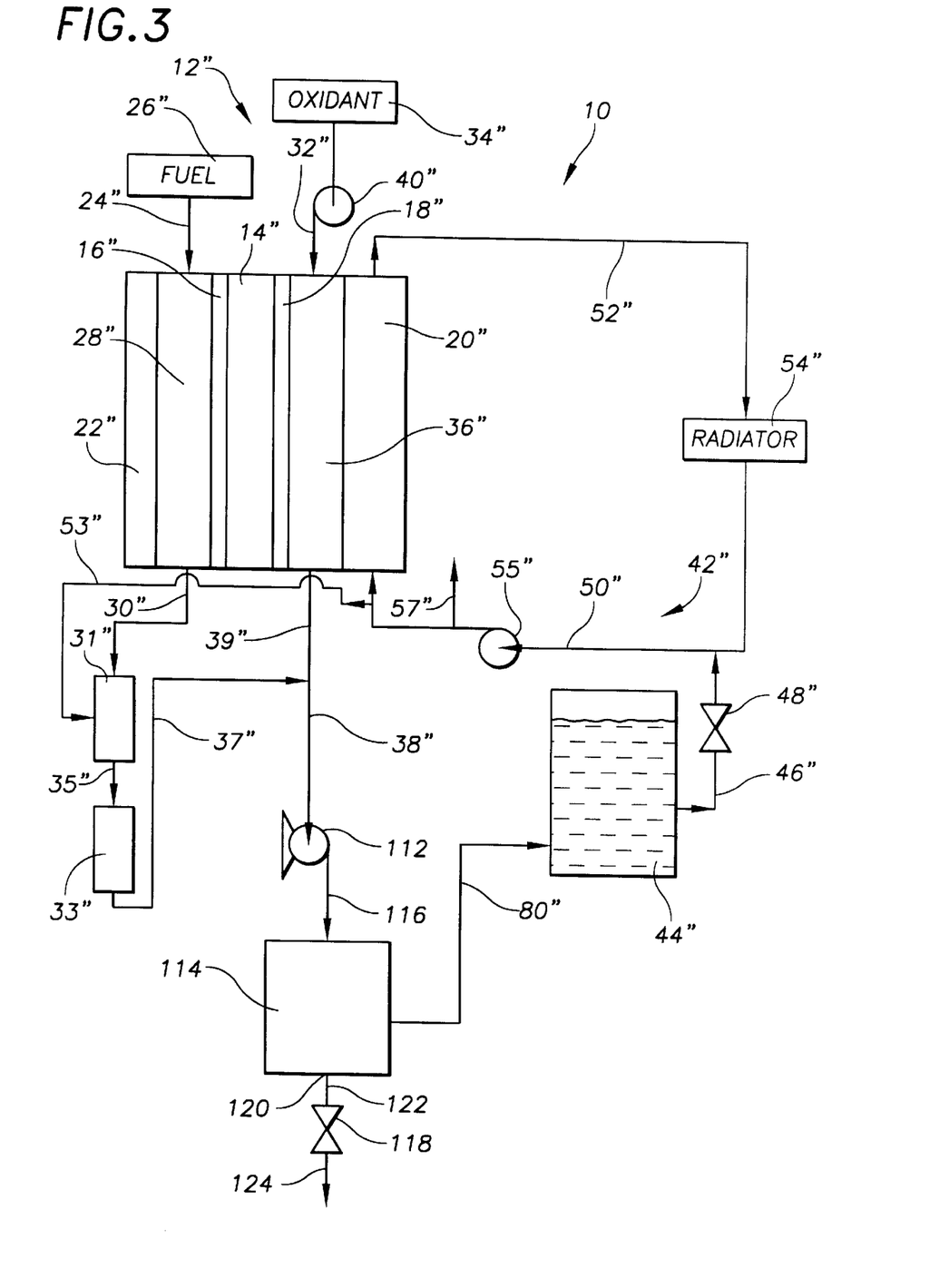
FIG. 3 is a schematic view of a second alternative embodiment of a pressurized water recovery system for a fuel cell power plant of the present invention.

FIG. 3 shows a second alternative or streamlined embodiment of the pressurized water recovery system 10 for a fuel cell power plant. For convenience, components of the system 10 that are shown in FIGS. 1 and 2 that are identical to the components shown in FIG. 3 are given double primes of the same reference numerals appearing in FIG. 1. In FIG. 3, the process exhaust stream within the process exhaust passage 38" is directed into a third supercharger 112 that selectively pressurizes the process exhaust stream, and then directs the process exhaust stream into a third pressurized condensing heat exchanger 114 either directly, or through a fifth diversion line 116. A third pressure valve 118 is in fluid communication with an outlet 120 of the third pressurized condensing heat exchanger 114, either directly or through a third pressure line 122, and the third pressure valve 118 is also in fluid communication with a third pressurized process exhaust stream vent 124 that directs the process exhaust stream out of the system 10. The third supercharger 112, third pressurized condensing heat exchanger 114, and third pressure valve 118 are similar in construction to the supercharger 62, pressurized condensing heat exchanger 66, and pressure valve 70 described above with respect to the FIG. 1 embodiment of the pressurized water recovery system 10.

The FIG. 3 streamlined embodiment of the system 10, however, does not include a three-way valve or non-pressurized condensing heat exchanger shown in the FIGS. 1 and 2 embodiments. Therefore, when the fuel cell 12 is operating in a normal ambient temperature range and the fuel cell is in water balance, the third supercharger 112, is not operated to pressurize the process exhaust stream, and the third pressure valve 118 is positioned to not restrict flow through the third pressurized condensing heat exchanger 114 so that the process exhaust stream remains at about ambient pressure within the third pressurized condensing heat exchanger 114. However, whenever the fuel cell 12 moves out of water balance, the third supercharger 112 selectively pressurizes the process exhaust stream and the third pressure valve 118 restricts discharge of the process exhaust stream out of the heat exchanger 114 to pressurize the process exhaust stream within the third pressurized condensing heat exchanger 114 and thereby increase an amount of water condensed out of the process exhaust stream, which water is directed through the condensed water line 80" secured to the coolant reservoir 44" of the coolant loop 42" to increase water within the coolant loop 42. Whenever the fuel cell 12 power plant is back in water balance, the third supercharger 112 and third pressure valve 118 are controlled to cease pressurizing the process exhaust stream. As is apparent, the FIG. 3 or streamlined embodiment of the pressurized water recovery system 10 requires that the entire condensing heat exchanger capacity of the system 10 be capable of sustaining a pressurized process exhaust stream, however, no non-condensing heat exchanger and no three-way valve is required. Consequently, for specific operating environments, the streamlined FIG. 3 embodiment of the system 10 incorporates weight, cost, and operating efficiencies.

Operation of the streamlined FIG. 3 embodiment of the pressurized water recovery system 10 includes the steps of selectively pressurizing with the third supercharger 112 the process exhaust stream whenever the plant is out of water balance, directing the pressurized process exhaust stream into the third pressurized condensing heat exchanger 114, and restricting flow of the process exhaust stream out of the third pressurized condensing heat exchanger 114 with the third pressure valve 118 to pressurize the process exhaust stream within the third pressurized condensing heat exchanger 114, and directing water condensed out of the pressurized process exhaust stream within the third pressurized condensing heat exchanger 114 through the condensed water line 80" to the coolant reservoir 44" of the coolant loop 42" until the plant is back in water balance.

Operation of the FIG. 1 embodiment of the pressurized water recovery system 10 of the present invention includes the steps of directing out of the process exhaust passage 38 with the process exhaust valve 56 a portion of the process exhaust stream passing within the process exhaust passage 38 from the anode exhaust passage 37 and cathode exhaust passage 39 to the condensing heat exchanger 58, whenever more water is being lost from the coolant loop 42 through the fuel cell 12 power plant than is being generated by the cathode electrode 18 of the fuel cell 12; pressurizing with the supercharger 62 the portion of the process exhaust stream directed out of the process exhaust passage 38; directing the pressurized portion of the process exhaust stream through the pressurized condensing heat exchanger 66 and pressure valve 70; and delivering water condensed from the process exhaust stream in the pressurized condensing heat exchanger 66 through the condensed water line 80 to the coolant loop 42.

As is apparent, the pressurized water recovery system 10 for a fuel cell power plant of the present invention enhances recovery of water from the fuel cell 12 through usage of components that are only operated during periods of coolant stress to the fuel cell. Therefore, the system 10 enables a fuel cell power plant to maintain a water balance and operate in water self-sufficiency through a wide range of operating environments with only a modest increase in weight, volume and cost, and only temporary, short term increases in parasitic power demands from the plant to operate the system 10.

While the present invention has been described and illustrated with respect to a particular construction of a pressurized water recovery system 10 for a fuel cell power plant, it is to be understood that the invention is not to be limited to the described and illustrated embodiments. For example, the invention has been described in application with a PEM fuel cell, but may also be applied to any type of fuel cell operating at near to ambient pressure such as phosphoric acid fuel cell. As a further example, the heat exchangers 54, 58, and 66, or 54', 84 and 96 while shown schematically in FIGS. 1 and 2 respectively as separated from each other, may be arranged in cooperative stacks within ambient air duct structures to take advantage of efficiencies of ducting a common gaseous cooling fluid. Additionally, a fuel cell power plant employing the pressurized water recovery system 10 may include fuel processing component means for processing fuels such as gasoline into a hydrogen rich reducing fluid fed to the anode flow field 28, wherein liquid water is directed from the coolant loop 42 to such fuel processing components as thermal steam reformers well-known in the fuel processing art. Accordingly, reference should be made primarily to the attached claims rather than the foregoing description to determine the scope of the invention.

What is claimed is:

1. A pressurized water recovery system for a fuel cell power plant, comprising:
   a. at least one fuel cell means having an electrolyte between an anode electrode and a cathode electrode for producing an electric current from a reducing fluid and an oxidant stream;
   b. a coolant loop having a coolant passage that directs a coolant fluid from a coolant reservoir through the coolant passage to the fuel cell means and back to the reservoir to cool the fuel cell means;
   c. a process exhaust passage that receives a cathode exhaust stream from a cathode exhaust passage in fluid communication with the cathode electrode, wherein the process exhaust passage directs the cathode exhaust stream as a process exhaust stream out of the fuel cell means;
   d. a supercharger in fluid communication with the process exhaust passage, wherein the supercharger pressurizes the process exhaust stream; and,
   e. a pressurized condensing heat exchanger in fluid communication with the supercharger that receives the process exhaust stream, the heat exchanger having a pressure valve secured to an outlet of the exchanger that restricts discharge of the process exhaust stream out of the pressurized condensing heat exchanger to pressurize the process exhaust stream within the heat exchanger, wherein the heat exchanger directs condensed water from the heat exchanger through a condensed water line back into the coolant loop.

2. The pressurized water recovery system of claim 1, wherein the process exhaust passage receives a combusted anode exhaust stream from an anode exhaust passage in fluid communication with an anode exhaust combustor that receives the anode exhaust stream from the anode electrode, and the combusted anode exhaust stream mixes with the cathode exhaust stream in the process exhaust passage to become the process exhaust stream.

3. The pressurized water recovery system of claim 1, wherein the supercharger and pressure valve pressurize the process exhaust stream in the pressurized condensing heat exchanger up to about 20 P.S.I.A.

4. The pressurized water recovery system of claim 1, further comprising a blower secured to an oxidant inlet in fluid communication with a cathode flow field adjacent the cathode electrode to variably accelerate flow of the oxidant stream entering the cathode flow field so that an operating pressure of the oxidant stream that becomes part of the process exhaust stream increases from atmospheric to about 1 P.S.I. above atmospheric pressure.

5. A pressurized water recovery system for a fuel cell power plant, comprising:
   a. at least one fuel cell means having an electrolyte between an anode electrode and a cathode electrode for producing an electric current from a reducing fluid and an oxidant stream;
   b. a coolant loop having a coolant passage that directs a coolant fluid from a coolant reservoir through the coolant passage to the fuel cell means and back to the reservoir to cool the fuel cell means;
   c. a process exhaust passage that receives a cathode exhaust stream from a cathode exhaust passage in fluid communication with the cathode electrode, wherein the process exhaust passage directs the cathode exhaust stream as a process exhaust stream out of the fuel cell means and into a condensing heat exchanger that directs condensed water from the heat exchanger in a condensed water line to the coolant reservoir;
   d. a process exhaust valve in fluid communication with the process exhaust passage that selectively directs any portion of the process exhaust stream out of the process exhaust passage;
   e. a supercharger in fluid communication with the process exhaust valve that receives the portion of the process exhaust stream directed out of the process exhaust passage by the process exhaust valve, wherein the supercharger pressurizes the received portion of the process exhaust stream; and,
   f. a pressurized condensing heat exchanger in fluid communication with the supercharger that receives the pressurized portion of the process exhaust stream having a pressure valve secured to an outlet of the pressurized condensing heat exchanger that selectively restricts discharge of the process exhaust stream out of the pressurized condensing heat exchanger to pressurize the process exhaust stream within the pressurized condensing heat exchanger, wherein the pressurized condensing heat exchanger directs condensed water into the condensed water line to direct the condensed water back into the coolant loop.

6. The pressurized water recovery system of claim 5, wherein the process exhaust passage receives a combusted anode exhaust stream from an anode exhaust passage in fluid communication with an anode exhaust combustor that receives the anode exhaust stream from the anode electrode, and the combusted anode exhaust stream mixes with the cathode exhaust stream in the process exhaust passage to become the process exhaust stream.

7. The pressurized water recovery system of claim 5, wherein the condensing heat exchanger and the pressurized condensing heat exchanger share a separator wall and are integrated to direct condensed water into the condensed water line secured between the integrated heat exchangers and the coolant reservoir.

8. The pressurized water recovery system of claim 7, wherein the separator wall includes a pressure actuated check valve permitting the process exhaust stream to pass between the condensing heat exchanger and the pressurized condensing heat exchanger whenever the supercharger is not pressurizing any portion of the process exhaust stream, and prohibiting the pressurized portion of the process exhaust stream from passing from the pressurized condensing heat exchange into the condensing heat exchanger whenever the supercharger is pressurizing a portion of the process exhaust stream.

9. The pressurized water recovery system of claim 5, wherein the supercharger and pressure valve pressurize the portion of the process exhaust stream received from the process exhaust valve up to about 20 P.S.I.A.

10. The pressurized water recovery system of claim 5, further comprising a blower secured to an oxidant inlet in fluid communication with a cathode flow field adjacent the cathode electrode to variably accelerate flow of the oxidant stream entering the cathode flow field so that an operating pressure of the oxidant stream that becomes part of the process exhaust stream increases from atmospheric to about 1 P.S.I. above atmospheric pressure.

11. A pressurized water recovery system for a fuel cell power plant, comprising:
   a. at least one fuel cell means having an electrolyte between an anode electrode and a cathode electrode for producing an electric current from a reducing fluid and an oxidant stream;
   b. a coolant loop having a coolant passage that directs a coolant fluid from a coolant reservoir through the coolant passage to the fuel cell means and back to the reservoir to cool the fuel cell means;
   c. a process exhaust passage that receives a cathode exhaust stream from a cathode exhaust passage in fluid communication with the cathode electrode, wherein the process exhaust passage directs the cathode exhaust stream as a process exhaust stream out of the fuel cell means and into an independent condensing heat exchanger that directs condensed water from the heat exchanger in a first condensed water line to the coolant reservoir;
   d. a process exhaust valve in fluid communication with the process exhaust passage, wherein the process exhaust valve selectively directs any portion of the process exhaust stream out of the process exhaust passage;
   e. a supercharger in fluid communication with the process exhaust valve that receives the portion of the process exhaust stream directed out of the process exhaust passage by the process exhaust valve, wherein the supercharger pressurizes the received portion of the process exhaust stream; and,
   f. a pressurized condensing heat exchanger in fluid communication with the supercharger that receives the pressurized portion of the process exhaust stream having a pressure valve secured to an outlet of the pressurized condensing heat exchanger that selectively restricts discharge of the process exhaust stream out of the pressurized condensing heat exchanger to pressurize the process exhaust stream within the pressurized condensing heat exchanger, wherein the pressurized condensing heat exchanger directs condensed water into a second condensed water line to direct the condensed water back into the coolant loop.

12. The pressurized water recovery system of claim 11, wherein the process exhaust passage receives a combusted anode exhaust stream from an anode exhaust passage in fluid communication with an anode exhaust combustor that receives the anode exhaust stream from the anode electrode, and the combusted anode exhaust stream mixes with the cathode exhaust stream in the process exhaust passage to become the process exhaust stream.

13. The pressurized water recovery system of claim 12, wherein the supercharger and pressure valve pressurize the portion of the process exhaust stream received from the process exhaust valve to about 20 P.S.I.A.

14. The pressurized water recovery system of claim 13, further comprising a blower secured to an oxidant inlet in fluid communication with a cathode flow field adjacent the cathode electrode to variably accelerate flow of the oxidant stream entering the cathode flow field so that an operating pressure of the oxidant stream that becomes part of the process exhaust stream increases from atmospheric to about 1 P.S.I. above atmospheric pressure.

15. The pressurized water recovery system of claim 14, wherein the system further comprises a porous coolant transport plate adjacent the cathode electrode that receives coolant fluid from the coolant passage.

16. The pressurized water recovery system of claim 15, wherein the coolant loop includes a coolant heat exchanger in fluid communication with the coolant passage that passes the coolant fluid in the coolant passage in heat exchange relationship with a cooling fluid.

17. A method of operating a pressurized water recovery system for a fuel cell power plant having at least one fuel cell for producing an electric current from a reducing fluid and an oxidant stream, and having a coolant loop that directs a coolant fluid from a coolant reservoir through a coolant passage to the fuel cell and back to the reservoir to cool the fuel cell, the method comprising the steps of:

a. pressurizing with a supercharger a process exhaust stream passing out of the fuel cell in a process exhaust passage, whenever water is being lost from the coolant loop;

b. directing the pressurized process exhaust stream through a pressurized condensing heat exchanger and pressure valve secured to an outlet of the pressurized condensing heat exchanger; and, c. directing water condensed from the pressurized process exhaust stream in the pressurized condensing heat exchanger to the coolant loop.

18. The method of operating a pressurized water recovery system for a fuel cell power plant of claim 17, comprising the further step of pressurizing the process exhaust stream in the pressurized condensing heat exchanger to approximately 20 P.S.I.A.

19. The method of operating a pressurized water recovery system for a fuel cell power plant of claim 17, comprising the further step of pressurizing the process exhaust stream in the pressurized condensing heat exchanger to about 20 P.S.I.A.

* * * * *